April 8, 1930. H. F. RUGGLES 1,753,753
HOISTING AND WEIGHING MEANS
Original Filed March 26, 1923   5 Sheets-Sheet 4
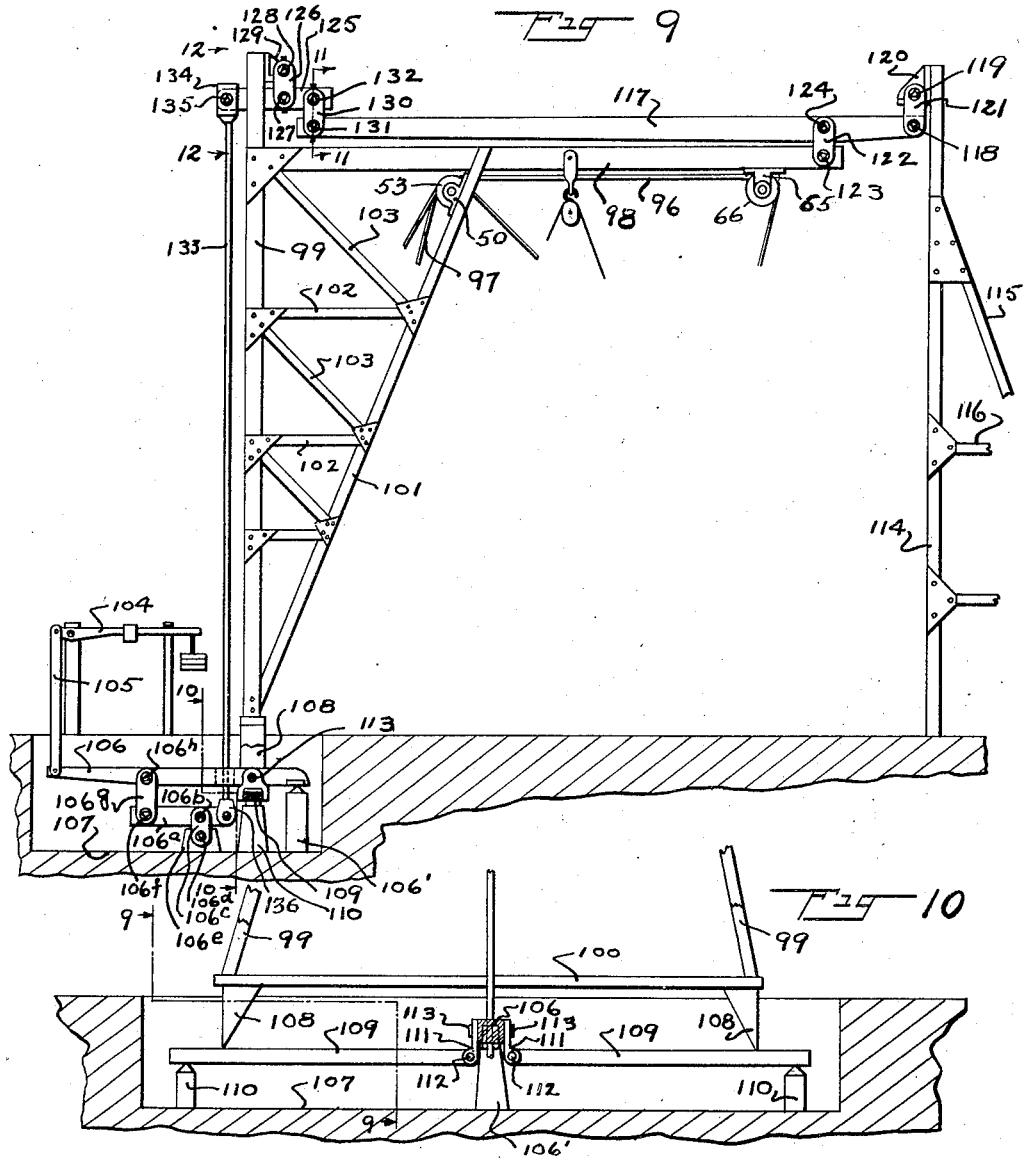
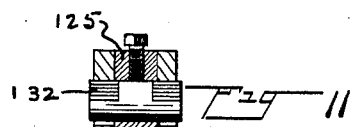
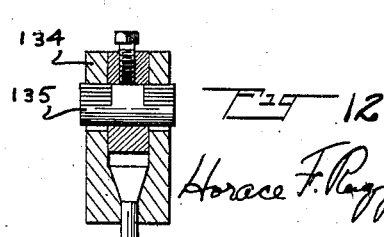

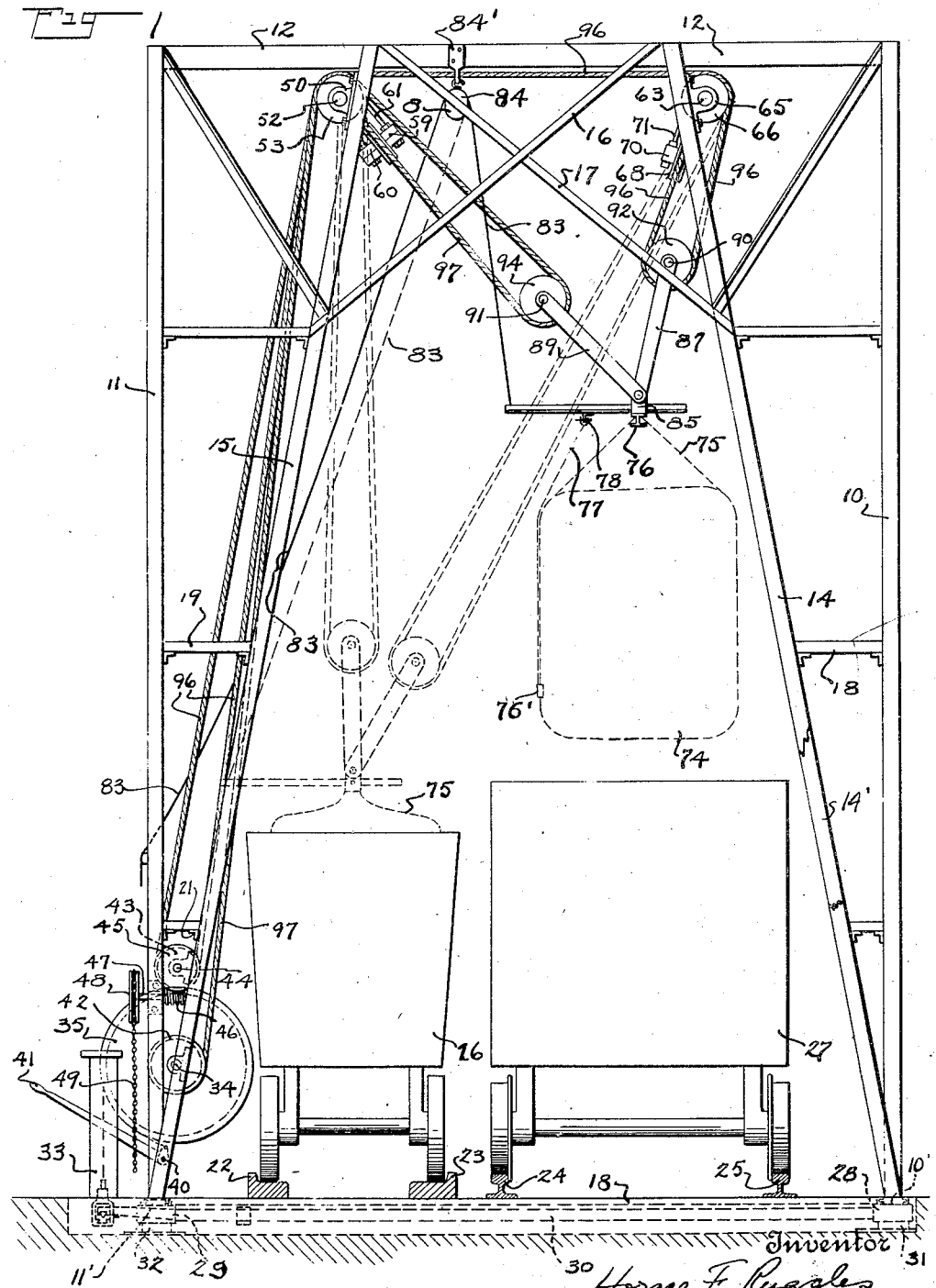

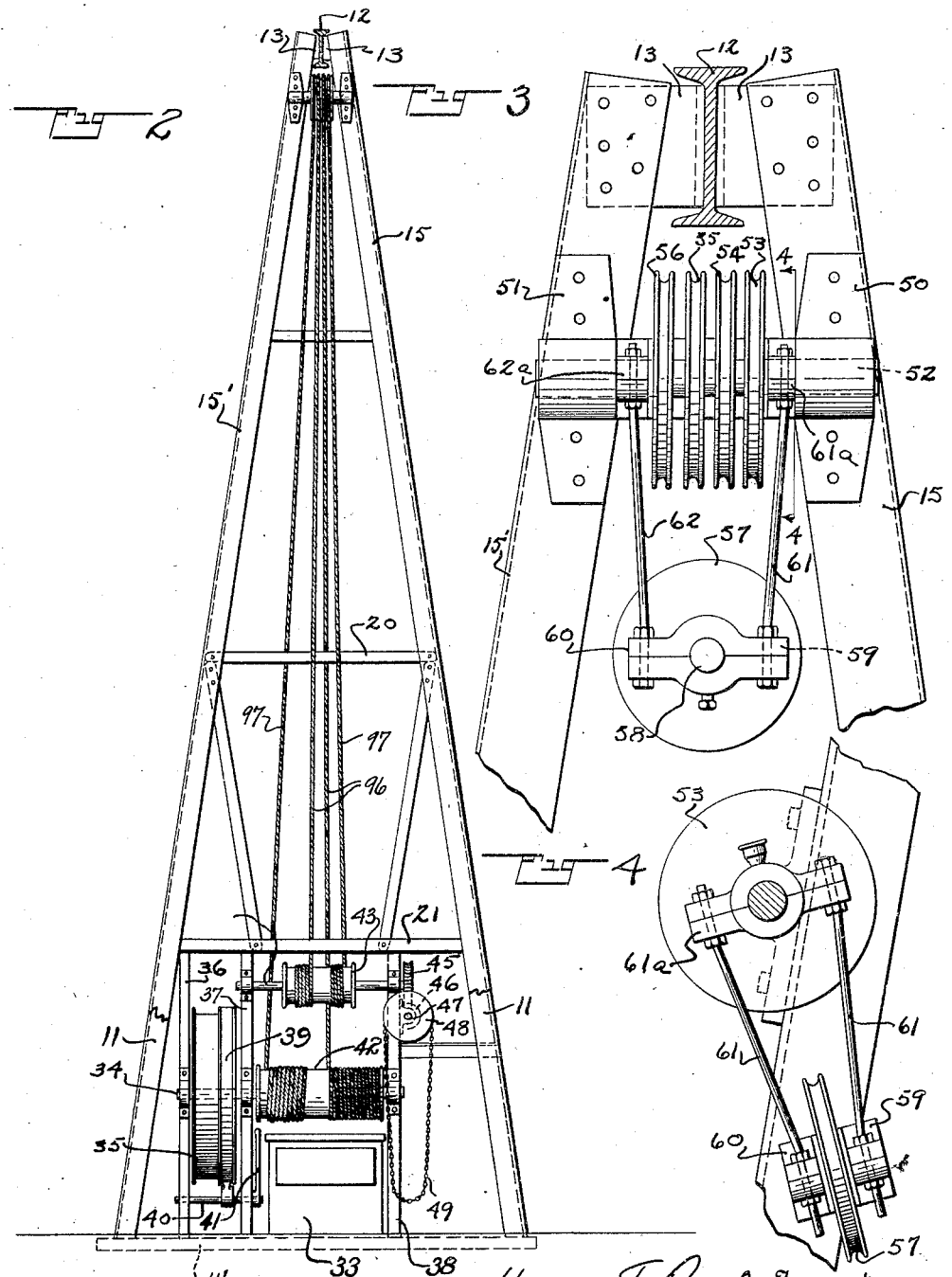

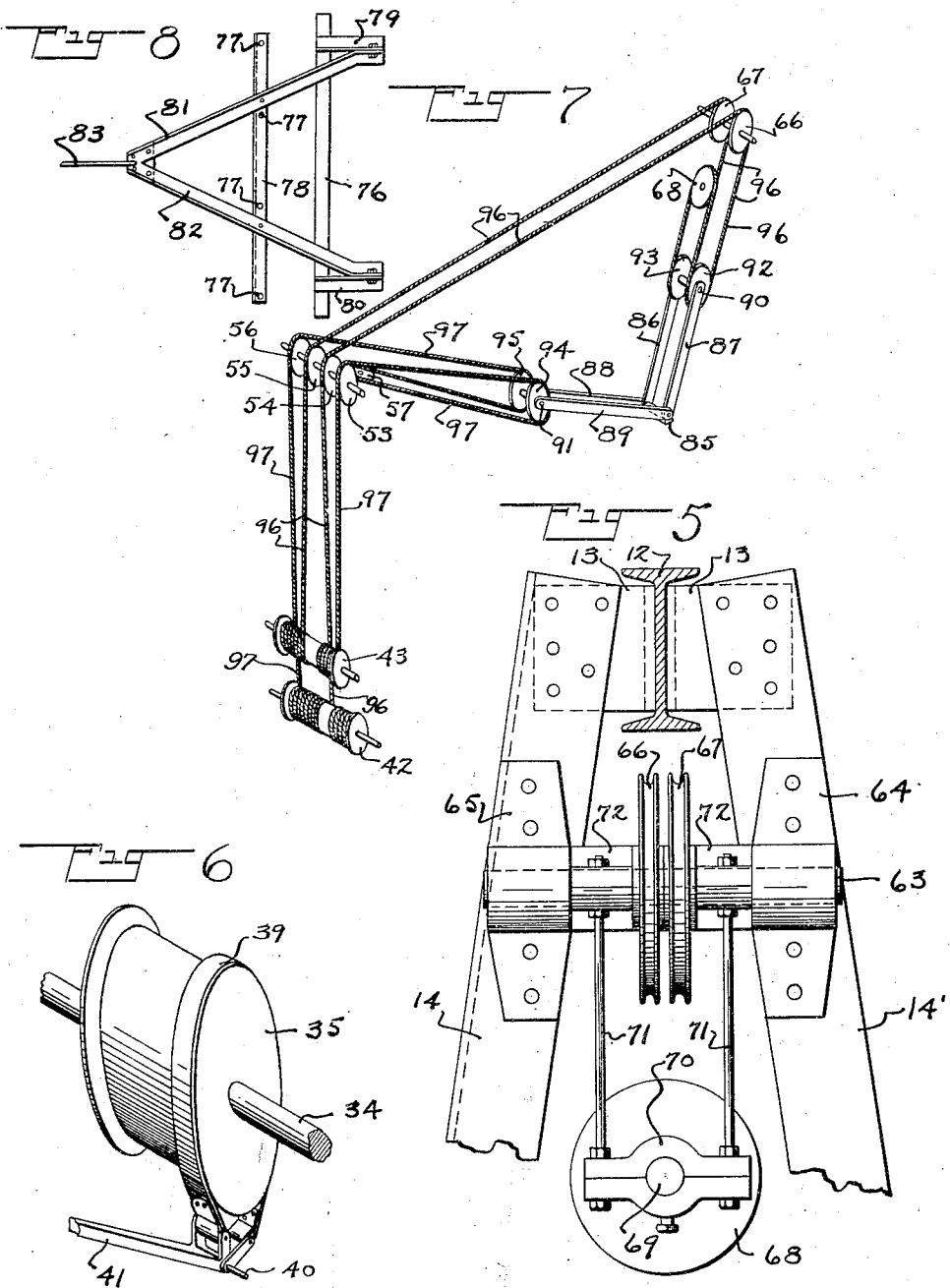

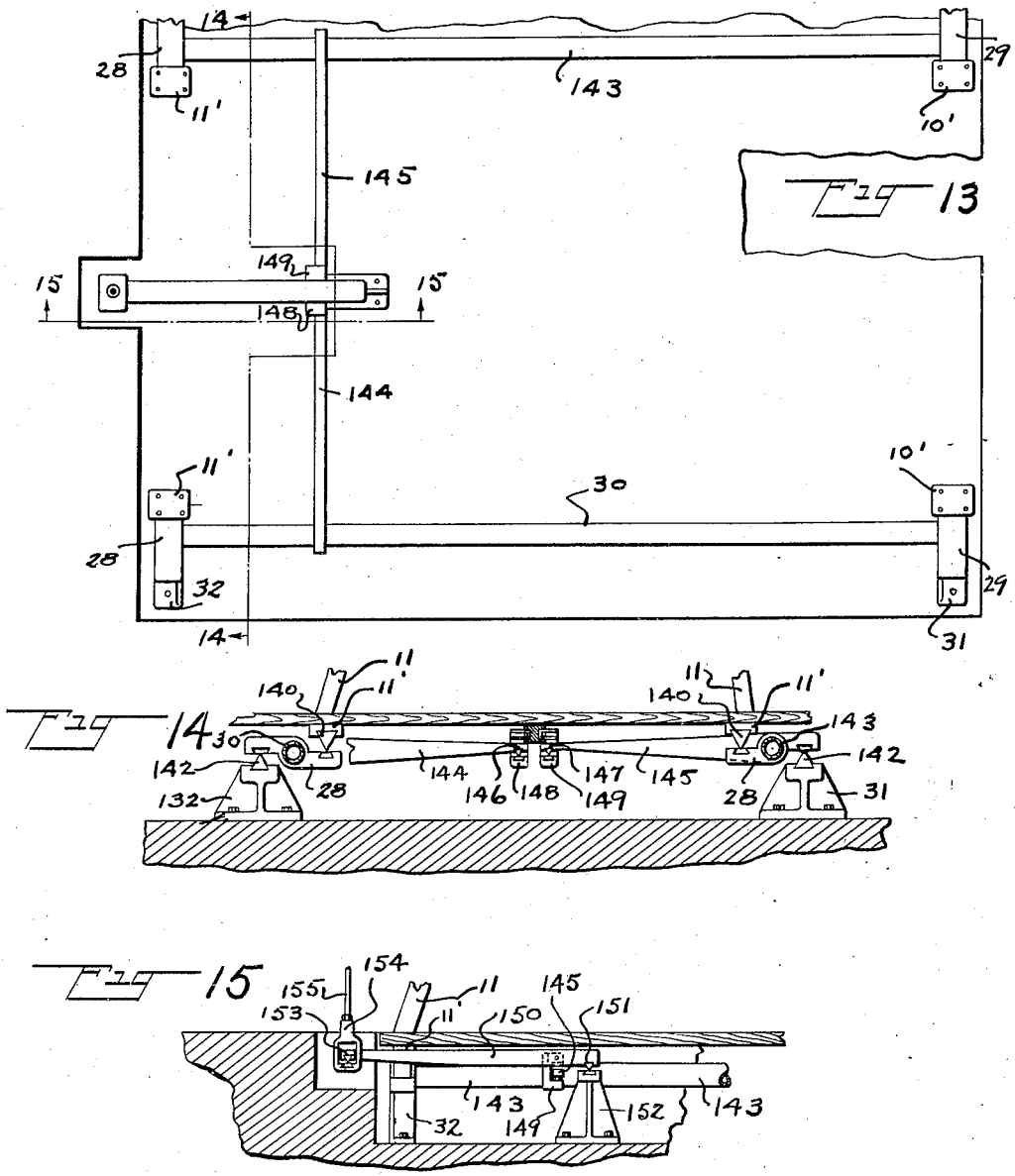

Patented Apr. 8, 1930

1,753,753

UNITED STATES PATENT OFFICE

HORACE F. RUGGLES, OF BROOKLYN, NEW YORK

HOISTING AND WEIGHING MEANS

Application filed March 26, 1923, Serial No. 627,836. Renewed September 11, 1929.

This invention relates to devices for hoisting and conveying material and is particularly adapted for use in connection with the transfer of sugar cane from the field cart to a railway car.

The main object of the invention is to produce a cane hoisting and traversing device which is simple in construction, inexpensive to manufacture, durable, and effective and reliable in operation.

A further object of the invention is to provide an improved combination of weighing means with hoisting and traversing means.

Other and ancillary objects will appear hereinafter.

In the accompanying drawings which illustrate the invention,

Figure 1 is a side view in elevation of a tower and hoisting and traversing mechanism;

Fig. 2 is an end elevation as viewed from the left in Figure 1 of the tower and hoisting and traversing mechanism, parts being omitted;

Fig. 3 is an enlarged fragmentary view from the left of the set of pulleys shown at the top and left in Figure 1;

Fig. 4 is a view taken on the line 4—4 of Fig. 3;

Fig. 5 is a view similar to Fig. 3 of the set of pulleys shown at top and right in Fig. 1 and as viewed from the right;

Fig. 6 is a perspective view of the bull wheel with the brake therefore;

Fig. 7 is a diagram of the cable and pulley arrangement;

Fig. 8 is a top plan view of a part of the sling-releasing means;

Fig. 9 is a view similar to Fig. 1 illustrating a modified form of support and weighing means and is a partial section on the line 9—9 of Fig. 10;

Fig. 10 is a vertical section on the line 10—10 of Fig. 9;

Figs. 11 and 12 are enlarged vertical sectional views on the lines 11—11 and 12—12, respectively of Fig. 9;

Fig. 13 is a top plan view of the supporting and weighing arrangement on which the tower is carried;

Fig. 14 is a section on the line 14—14 of Fig. 13; and

Fig. 15 is a section on the line 15—15 of Fig. 13.

Referring to the drawings, a tower of supporting frame is provided with two pairs of legs, two of them 10 and 11 being shown in Figure 1. The legs of each pair incline towards each other and at their upper ends are secured to an overhead I-beam 12. Beams 14 and 15 secured to the legs of the tower at the base thereof extend upwardly at an angle and are inclined inwardly and the upper ends thereof are secured to the I-beam 12, by means of metal plates 13, similar plates being employed to secure the upper ends of the legs 10 and 11 to the I-beam 12. Crossed braces 16 and 17 are provided for the upper portion of the beams 14 and 15. Other braces 18 and 19 secure the beams 14 and 15 to the legs 10 and 11 respectively. The beams 15 and 15' are secured together by braces 20 and 21, a sufficient number being employed so that a firm support will be provided for the tower. In Figure 1 the inclined beam 14 is broken away to show a similar beam 14'. The inclined beams 14, 14', 15 and 15' may be considered as the load carrying member, the legs 10, 11 etc. completing and bracing the frame.

Sufficient space is provided between the pair of inclined beams 14, 14', and the similar pair of beams 15, 15' for tracks 22 and 23, 24 and 25, upon which carts 26 and railway cars 27 may travel. The tracks 22 and 23 are to guide the wheels of the carts 26 which come in from a sugar cane field, while the tracks 24 and 25 are the conventional railroad tracks.

The ends of the pairs of legs 10 and 11 of the tower or support are supported on base pieces 10' and 11'. The base pieces 11' are supported by knife edges 140 on cast iron lever arms 28 which are respectively pivoted on knife edges 142 carried by the stationary anchor blocks 32. In the same manner the base pieces 10' supporting the tower legs 10 are mounted on cast iron levers 29 which are mounted in the same way as the levers 28 upon anchor blocks 31. The levers 28 and 29 upon one side have secured in them the ends of a tubular bar or pipe 143 which are fixedly secured to these levers either by having the ends cast therein or fixedly secured therein in any other suitable way so that any unequal turning of the arms 28 about their pivots is resisted by the torsional strength of the bar or pipe 143, the arms 28 and 29 connected by the pipe 143 being thus held in fixed angular relationship with relation to their pivotal points. The pivoted levers of each pair of levers 28 and 29 connected by the torsion pipes 143 and 30 respectively turn about substantially the same axes.

Similarly the other arms 28 and 29 are united by a tubular bar or pipe 30 so that these arms or levers are held against unequal turning on their pivots by the torsional strength of the bar or pipe 30. Securely fixed to the pipes 30 and 143 respectively are the arms 144 and 145 which, at their outer ends carry knife edges 146 and 147 bearing in stirrups 148 and 149 fixed to the lever arm 150 which is pivoted by knife edges 151 on anchor block 152, the other end of the bar 151 bearing by means of knife edges 153 within the stirrup 154 secured to the rod 155 passing to the weighing beam of the scales.

It will now be apparent that the weight of the tower being borne upon its legs, and these legs being connected as described with the scale beams, that the total weight of the tower and its carried load will effect the scale beam and be weighed thereby.

It will thus be seen that the weight of the load hoisted may be easily determined merely by balancing the scale so as to include the weight of the tower and hoisting device mounted thereon.

It will also be seen that the scale levers as shown in Figs. 13, 14 and 15 are mounted below the ground, and that in order to enable the pipe levers 143 and 30 to extend to the tower leg supports upon the opposite side, it is only necessary to provide a narrow trench or ditch so that the labor and expense of installation are very much reduced over what would be the case if other forms of levers requiring excavation over the whole area of the base of the tower were employed. Furthermore the avoidance of undermining the support on which stand the railway car or the cane carts renders such support much more secure.

Adjacent the base of the tower on a shaft 34 is fixed a bull wheel 35. The shaft 34 is rotatably mounted in brackets secured to supports 36, 37 and 38, which at their lower ends are supported upon the base-piece 11 (Figure 2). The bull wheel 35 may be rotated by a cable (not shown) wound thereupon and attached thereto at one end, and adapted to be pulled by a bull, as is customary. A brake-strap 39 surrounds the bull wheel, the ends thereof being secured to links, which are fastened to an operating lever 41. The lever 41 is pivoted to a shaft 40. It will be seen that by moving the lever 41 in one direction a braking action will be produced on the bull wheel.

A hoisting drum 42 is mounted upon the shaft 34 for rotation therewith between the supports 37 and 38.

A traversing drum 43 is secured to a shaft 44 which rotates in journals on the supports 37 and 38. The traversing drum 43 is mounted above the hoisting drum 42. Secured to one end of the shaft 44 is a worm wheel 45, which meshes with a worm 46 secured on a shaft 47, which carries a wheel 48 at its opposite end. The worm wheel 45 meshes with the worm 46 at such an angle that the worm wheel cannot rotate the worm, although the converse is true, that the worm can rotate the worm wheel. For rotating the wheel 48 a manually operable endless chain 49 is provided. It will thus be seen that by pulling on the chain 49 the traversing drum 43 may be rotated in the desired direction.

Mounted in brackets 50 and 51 on the brace beams 15 and 15' adjacent their point of connection to the I-beam 12 is a shaft 52 upon which are rotatably mounted pulleys 53, 54, 55 and 56. A pulley 57, rotatable on a shaft 58 which is mounted in brackets 59 and 60, is pivotally secured to the shaft 52 by rods 61 and 62, as shown in Fig. 4. Brackets 61a and 62a are provided to rock on the shaft 52, and to which the two pairs of rods 61 and 62 are secured. It will be noted that the axis of the pulley 57 is perpendicular to the axis of the pulleys 53, 54, 55 and 56.

Mounted on the brace beams 14 and 14' near their point of connection to the I-beam 12 is a shaft 63, which is held in place by brackets 64 and 65. Two pulleys 66 and 67 are rotatably mounted on the shaft 63. A third pulley 68, whose axis is perpendicular to the axis of the pulleys 66 and 67, is mounted on a shaft 69. Brackets 70 hold the shaft 69 in place and rods 71 connect the brackets 70 to brackets 72 rockable on the shaft 63, so that the pulley 68 is adapted to pivot about the shaft 63.

The load of sugar cane 74, which is to be hoisted, weighed and transferred, is shown diagrammatically in Fig. 1. A plurality of chain slings 76 encircle the sugar cane, and are connected to a sling-beam shown as an I-beam 76. The ends of each chain 75 are fastened together by a trip hook 76', to which a chain 77 is secured at one end, the other end being connected to a bar 78. Pivoted at one end to brackets 79 and 80 mounted upon the sling-beam 76, are bars 81 and 82 respectively, the free ends of which are secured together. The bar 78 is secured to the bars 81 and 82. A cord 83 is attached at one end to the bars 81 and 82 at their point of connection and extends upwardly over a pulley 84, mounted in a bracket 84' on the sling-beam 12, and then extends to the base of the tower, so that the operator can release the load at the desired point by pulling the cord which will exert a pull on the chain 77, thereby releasing the trip hooks 76'. The bars 81 and 82 are pivoted to the brackets 79 and 80 instead of to the sling-beam 76 for the reason that the trip hooks 76' will be released more easily, inasmuch as the bars 81 and 82 do not have to move through such a great arc in order to exert an effective pull.

Secured to the sling-beam 76 is a bracket 85, to which the lower ends of a plurality of links 86, 87, 88 and 89 are pivotally attached. The upper ends of the links 86 and 87 are connected together by a rod 90, and the upper ends of the links 88 and 89 are connected together by a rod 91, so that the links form diverging pairs. Pulleys 92 and 93 are mounted on the rod 90, and the rod 91 has pulleys 94 and 95 thereon.

A cable 96, secured at one end to the hoisting drum 42, is wound thereabout several turns, and then extends upwardly over the pulley 54, then across to and over the pulley 66; then downwardly around the pulley 92; upwardly around the pulley 68; then downwardly about the pulley 93; then upwardly to the pulley 67; then across to the pulley 55, and then around the traversing drum 43. A cable 97, secured at one end of the hoisting drum 42, is wound thereabout several turns, in the same direction as the cable 96, and then extends over the pulleys 56, 95, 57, 94 and 53, successively, the opposite end being secured to the traversing drum 43, and being wound for several turns thereon in an opposite direction from the direction in which the cable 96 is wound on the same drum.

It will be noted that the links 86, 87, 88 and 89, together with the rods 90 and 91, and pulleys 92, 93, 94, and 95, bracket 85 and beam 76, form a load-carrying device which connects together the cables 96 and 97.

In the operation of the above described device, assuming that the slings 75 are lowered and attached to the load of sugar cane in the cart 26, as shown in broken lines in Figure 1, the bull, electric motor, gasoline engine, or any suitable source of power, will be started, to rotate the bull wheel 35 in a clockwise direction, as viewed in Figure 1. This will, of course, rotate the shaft 34 and the hoisting drum 42 mounted thereon. The cables 96 and 97 will be wound upon the drum 42, and by this operation due to the arrangement of the pulleys above described, the load 74 will be raised substantially vertically, the sets or pairs of links 88 and 89, and 86 and 87 tending to open up or spread apart. It is then desired to traverse the load so that it will be directly over the car 27. This can be done by manually rotating the traversing drum 43 by means of the chain 49 acting through the wheel 48, worm 46, and worm wheel 45. By rotating the drum 43 in a counter-clockwise direction, the cable 97 will be unwound, and at the same time the cable 96 will be wound on the drum 43, so that the load will be moved transversely of the tower, along the overhead load-supporting beam 12, between the two above described sets of pulleys carried thereby. Thus, it will be seen, that the same cables 96 and 97, which operate to hoist the load of sugar cane, also serve to traverse it between the legs of the tower.

After the load is hoisted, the weight thereof will register on the scale 33, so that the operator, who hoists and traverses the load, can also attend to the weighing operation.

Assuming now that the sugar cane has been hoisted and traversed until it is directly over the car 27, the operator will release the brake 39 by movement of the handle 41 permitting the sugar cane to be lowered gradually. When the sugar can has been lowered to the desired position above the car 27, the operator will pull the cord 83 which will lift the pivoted bars 81 and 82 thereby releasing the trip hooks 76' so that the sugar cane will drop from the slings 75 into the car 27.

By reversing the operation, above described, the slings may be brought back to the cart 26.

The improved weighing means or mechanism illustrated in Figures 9 to 12 inclusive and forming a feature of the present invention, is adapted to be employed in combination with the hereinbefore described cane hoisting and traversing mechanism illustrated in Figures 1 to 8 inclusive, comprising the system of pulleys, the cables 96 and 97, the winding drum 42 and the traversing drum 43.

The improved cane hoisting, traversing and weighing device shown in Figs. 9 to 12 inclusive comprises a substantially horizontal overhead load-supporting beam 98 which is rigidly mounted at one of its ends upon the upper end portions of a pair of downwardly-diverging leg members 99 connected together at their lower ends by a transverse bar 100 to form a rigid framework, and the leg members 99 may also be connected together and further braced by means of braces similar to the braces 20 and 21 etc., shown in Fig. 2. The overhead beam 98 is braced and the rigidity of its mounting upon the leg members 99 increased by means of inclined brace beams 101, similar to the brace beams 15 and 15' shown in Fig. 2. Horizontal braces 102 and inclined braces 103 are secured to the respective brace beams 101 and to the corresponding leg members 99.

A weighing scale is provided adjacent the lower end of the framework having the leg member 99, the scale including a weigh-beam 104 and a link 105 pivotally connecting the weigh-beam to one end of a substantially horizontal movement-multiplying weight-transmitting lever 106 in a scale-pit 107, the other or inner end of the lever 106 being pivotally supported upon a knife-edge fulcrum-block 106'. The outer ends of the lower bar 100, beneath and adjacent the lower ends of the leg members 99, are provided with downwardly extending knife-edge block 108, the knife-edges of which respectively pivotally rest upon movement-multiplying weight-transmitting levers 109 which extend substantially horizontally inwardly towards each other transversely to the lever 106, the outer ends of the levers 109 being pivotally supported upon knife-edge fulcrum-blocks 110 in the scale pit 107. The inner or adjacent ends of the substantially horizontal levers 109 are pivotally connected to the other end of the lever 106 by means of links or hangers 111 mounted upon knife-edges 112 carried by the levers 109 and other knife edges 113 carried by the lever 106.

Adjacent and shown as spaced outwardly from the outer or free end of the overhead load-supporting beam 98 is a post 114 which is rendered rigid in its upright position by means of a brace-beam 115 and transverse connecting braces 116. The post 114 may comprise a pair of inclined leg members, similar to the leg members 99.

A substantially horizontal overhead movement-multiplying and weight-transmitting lever 117 is fulcrumed at one of its ends upon the top of the post 114 by means of knife-edges 118 on the lever 117, other knife edges 119 carried by a bracket 120 mounted upon the top of the post 114, and short links or hangers 121 mounted upon the knife-edges 118 and 119. The overhead lever 117 extends from its fulcrum on the post 114 along and above the overhead load-supporting beam 98 to a point substantially adjacent to the upper ends of the leg members 99.

The outer or free end of the overhead beam 98 is pivotally connected to and supported upon the overhead lever 117 by means of short links or hangers 122 mounted upon knife-edges 123 on the end of the overhead beam 98 and other knife-edges 124 carried by the overhead lever 117.

A weight-transmitting lever 125, of the first order, shown as a movement-multiplying lever, is fulcrumed upon the tops of the leg members 99 by means of short hanger-links 126, knife-edges 127 carried by the lever 125 and other knife-edges 128 carried by a bracket 129 mounted upon the upper ends of the leg members 99. One arm of the lever 125 extends inwardly above the adjacent end of the overhead lever 117 and is pivotally connected thereto by means of short links 130 mounted upon knife-edges 131 and 132 carried respectively by the adjacent ends of the overhead lever 117 and lever 125. The outer end of the lever 125 is pivotally connected to the upper end of a vertically disposed long tension link 133 by means of a yoke 134 provided with knife edges 135. The long link 133 at its lower end is pivotally connected to a reversing lever 106$^a$, shown as a movement-multiplying lever, by means of a yoke 136, on the lower end of the link 133, and knife-edges 137 carried by the reversing lever 106$^a$. Between its ends the reversing lever 106$^a$ carries fulcrum-providing knife-edges 106$^b$ engaged by anchor links 106$^c$ which at their lower ends engage knife-edges 106$^d$ carried by an anchor block 106$^e$. The other end of the reversing lever 106$^a$ carries knife-edges 106$^f$ engaged by link 106$^g$ which at their upper ends engage knife-edges 106$^h$ on the weigh-beam connected lever 106. It will be observed that the overhead lever 117 has a comparatively short arm between its fulcrum pivot 118 and its intermediate pivot point 124 and has a much longer arm connected to the lever 125, which latter lever forms an intermediate direction-changing or movement-reversing connection between the long arm of the lever 117 and the lifting link of tension link 133.

The arrangement of the several weight-transmitting levers is such that the load carried by the overhead beam 98 will have its weight correctly indicated by the weigh-beam 104 regardless of the position of the load along the overhead beam 98.

The set of pulleys shown in Figure 5 for the cable 96 is mounted upon the beam 98, the pulley 66, the pulley-carrying bracket 65 and a portion of the cable 96 being shown in Fig. 9. The inclined brace beams 101, at a point adjacent the overhead beam 98, carry the set of pulleys shown in Figs. 3 and 4 for the cable 97, the cable 96 also passing over one of the pulleys of this set, the pulley-carrying bracket 50, the pulley 53 and a portion of the cable 97 being shown in Fig. 9.

In order to avoid needless repetition, the remaining parts or features of the hoisting and traversing mechanism, which are fully illustrated in Figs. 1 to 8 inclusive and hereinbefore particularly described, are not illustrated in Figs. 9 to 12 inclusive, and for the same reason the cane cart 26 and the railway car 29 have not been shown in Fig. 9.

It is to be understood that hanger-links similar to the links 121, 122, 126 and 130 which are shown as employed at the top of the tower, in one of the lever-systems, may be likewise employed instead of the knife-edge pivot-blocks 108 and the knife-edge fulcrum-blocks 110 for the lower levers 109, if desired.

The operation of the device shown in Figs. 9 to 12 inclusive has been described along with the description of the construction thereof.

The cane hoisting and weighing apparatus shown in Figures 9 to 12 inclusive has a distinct advantage over that shown in Figures 1 to 8 inclusive, in that, in the apparatus shown in Figures 9 to 12 inclusive it is impossible for a person distant from the scale, and therefore not likely to be seen by the man doing the weighing, to tamper with the apparatus so that the weight indicated by the scale will be incorrect. For example, in the apparatus shown in Figures 1 to 8 inclusive, a man, hidden by the car 27, unobserved by the weigh-master at the scale 33, could throw his weight upon the legs 10 and thereby cause an overweight of the load to be indicated by the scale.

While the invention has been illustrated in what are considered its best applications it may have other embodiments without departing from its spirit and is not therefore limited to the structures shown in the drawings.

What I claim is:

1. In a hoisting mechanism the combination with load carrying means, a support, cables at angles to each other and secured to said load carrying means, means for operating said cables to hoist said load carrying means and means operable independently of the aforesaid cable operating means to vary the tension on said cables due to the weight of the load in order to traverse the said load carrying means, the independent means being capable of operation while the hoisting means is stationary and vice versa.

2. In a hoisting mechanism the combination with load-carrying means, a support, cables at angles to each other and secured to said load-carrying means and winding drums for operating said cables to hoist said load-carrying means and to wind and pay out said cables to traverse said load-carrying means, the hoisting and traversing drums being independently operable and operable at different times to perform hoisting and traversing.

3. A hoisting apparatus comprising in combination a load-carrying device, a pair of load-hoisting and load-traversing cables connected to the load-carrying device and diverging upwardly therefrom, means to draw upon both of the cables to hoist the load, and means to draw upon one of the cables and concomitantly to pay out the other cable for traversing the hoisted load, said traversing and hoisting means being independently operable and operable at different times to perform hoisting or traversing.

4. The combination of a support, a drum rotatably mounted adjacent the base of said support, means for rotating said drum, a pair of cables, one end of each of said cables being wound on said drum, a pulley for each cable secured to said support adjacent the top thereof in spaced relation, means for releasably attaching a load to said cables to be hoisted thereby, and means to act upon said cable to traverse said hoisted load from one towards the other of said pulleys, said drum and said traversing means being independently operable and operable at different times to hoist or traverse the load respectively.

5. The combination of a support, a load-hoisting drum mounted on said support adjacent the base thereof, means to rotate said drum, a load-traversing drum mounted on said support adjacent the base thereof, and a pair of cables for hoisting and traversing a load, one of the ends of each of said cables being wound about said hoisting drum in the same direction, the other end of each of said cables being wound around said traversing drum in opposite directions, two sets of separated pulleys at the top of said support, one set of pulleys for each of said cables, and between which the hoisted load is traversed and means for releasably connecting said cables to a load, said connecting means including a pulley for each of said cables.

6. The combination of a support, a hoisting drum mounted on said support, a traversing drum also mounted on said support, a plurality of cables, one end of each cable secured to said traversing drum, the opposite end of each cable secured to said hoisting drum, and means for rotating said drums independently of each other.

7. The combination of a support, a hoisting drum mounted on said support, a traversing drum mounted on said support adjacent said hoisting drum, cables having one end wound on the hoisting drum, the opposite ends thereof wound on said traversing drum, said cables being wound upon said traversing drum in opposite directions, and upon said hoisting drum in the same direction.

8. A hoisting and traversing device comprising a substantially horizontal overhead load-supporting beam, means to support the beam, and load hoisting and traversing means comprising pulleys mounted at spaced points along said overhead beam, cables passing over the respective pulleys, a load-carrying device connecting said cables together, means for releasably attaching a load to said load-carrying device, a winding drum for winding up both cables concomitantly to hoist the load, and a traversing drum for winding up one of the cables and for concomitantly unwinding or paying out the other cable, thereby to traverse the load along the over-head beam from one towards the other of said pulleys thereon.

In testimony whereof I have signed this specification this 1st day of March, 1923.

HORACE F. RUGGLES.